United States Patent [19]
Yatka et al.

[11] Patent Number: 5,612,070
[45] Date of Patent: Mar. 18, 1997

[54] CHEWING GUMS CONTAINING NATURAL CARBOHYDRATE GUM HYDROLYZATE

[75] Inventors: Robert J. Yatka, Orland Park; Lindell C. Richey, Lake Zurich; Marc A. Meyers, Naperville; David G. Barkalow, Deerfield, all of Ill.

[73] Assignee: Wm. Wrigley Jr. Co., Chicago, Ill.

[21] Appl. No.: 492,022

[22] PCT Filed: Dec. 3, 1993

[86] PCT No.: PCT/US93/11766

§ 371 Date: Sep. 12, 1995

§ 102(e) Date: Sep. 12, 1995

[87] PCT Pub. No.: WO94/14332

PCT Pub. Date: Jul. 7, 1994

[51] Int. Cl.⁶ ........................................................ A23G 3/30
[52] U.S. Cl. ................................ 426/3; 426/573; 426/658
[58] Field of Search .......................... 426/3–6, 573–578, 426/658

[56] References Cited

U.S. PATENT DOCUMENTS

| | | | |
|---|---|---|---|
| 3,161,524 | 12/1964 | Opie et al. | 426/549 |
| 3,455,899 | 7/1969 | Keen | 426/573 |
| 3,843,818 | 10/1974 | Wren et al. | 426/346 |
| 3,996,389 | 12/1976 | Osborne | 426/565 |
| 4,127,677 | 11/1978 | Fronczkowski et al. | 426/5 |
| 4,332,894 | 6/1982 | Whistler | 435/99 |
| 4,792,453 | 12/1988 | Reed et al. | 426/5 |
| 4,828,845 | 5/1989 | Zamudio-Tena et al. | 426/5 |
| 5,133,979 | 7/1992 | Clarke et al. | 426/49 |
| 5,156,835 | 10/1992 | Nabi et al. | 424/52 |
| 5,248,508 | 9/1993 | Reed et al. | 426/5 |
| 5,437,875 | 8/1995 | Synosky et al. | 426/3 |
| 5,462,754 | 10/1995 | Synosky et al. | 426/4 |

FOREIGN PATENT DOCUMENTS

| | | |
|---|---|---|
| 0324720 | 7/1989 | European Pat. Off. . |
| 0449594A2 | 10/1991 | European Pat. Off. . |
| 0457098A1 | 11/1991 | European Pat. Off. . |
| 85-224449 | 11/1985 | Japan . |
| 87-146562 | 6/1987 | Japan . |
| 93-115247 | 5/1993 | Japan . |
| WO90/14017 | 11/1990 | WIPO . |
| WO94/14331 | 7/1994 | WIPO . |
| WO93/15116 | 8/1993 | WIPO . |
| WO94/14332 | 7/1994 | WIPO . |
| WO94/16575 | 8/1994 | WIPO . |

OTHER PUBLICATIONS

Guar Gum by James K. Seaman, 19 pages, undated.
Advertising brochure entitled "Hydrocolloids" by Sanofi Bio–Industries, 73 pages, 1993.
Advertising brochure entitled "Sunfiber" by Sandoz Nutrition, 2 pages, undated.
Information Sheet entitled "Benefiber" by Sandoz, 1 page, 1992.
Report entitled "What is Sunfiber?" by IBC USA Conference on bulking Agents, Prospects & Applications, 33 pages, 1991.

*Primary Examiner*—Jeanette Hunter
*Attorney, Agent, or Firm*—Steven P. Shurtz; Brinks Hofer Gilson & Lione

[57] ABSTRACT

Chewing gum products containing a natural carbohydrate gum hydrolyzate and methods of making such products are disclosed. In one embodiment, the natural carbohydrate gum hydrolyzate is used in a rolling compound applied to the chewing gum product. In a second embodiment, a natural carbohydrate gum hydrolyzate is used in the center fill of a chewing gum. In a third embodiment, aspartame is used to sweeten the gum composition and the natural carbohydrate gum hydrolyzate is provided, preferably in an effective amount to stabilize the aspartame such that after eight weeks of storage at 85° F., at least 5% less aspartame decomposes than would have decomposed if the natural carbohydrate gum hydrolyzate was not included. A natural carbohydrate gum hydrolyzate is also co-dried with other sweeteners, co-evaporated to make syrups and used as an encapsulating agent for high-intensity sweeteners or flavors used in gum compositions.

20 Claims, 4 Drawing Sheets

CHEWING GUMS CONTAINING NATURAL CARBOHYDRATE GUM HYDROLYZATE

CROSS REFERENCE TO RELATED APPLICATION

The present application is a continuation-in-part of PCT application Ser. No. PCT/US92/11198, filed Dec. 23, 1992, now WO94/14332 designating the United States, which is hereby incorporated by reference.

BACKGROUND OF THE INVENTION

The present invention relates to improved compositions of chewing gum. More particularly, the invention relates to improving chewing gum by the use of specific bulking agents in sugar and non-sugar chewing gum products to give improved texture, moisture absorption properties, and improved shelf life properties. The improved chewing gum compositions may also be used in a variety of chewing gum products, such as confectionery coated chewing gum products.

In recent years, efforts have been devoted to replace sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture and shelf life properties of chewing gum for consumers.

The polyols have the advantage of not contributing to dental caries of consumers, as well as being able to be consumed by diabetics. However, all polyols have the disadvantage of causing gastrointestinal disturbances if consumed in too great of a quantity. Therefore it would be a great advantage to be able to use a carbohydrate or carbohydrate-like food ingredient for chewing gum that would act as a bulking agent, but not contribute to dental caries nor cause as severe gastrointestinal disturbances.

One such bulking agent comprises guar gum hydrolyzate. This bulking agent or bulk sweetener is not approved for use in human food products or in chewing gum in the U.S. However, a GRAS affirmation petition for guar gum hydrolyzate as a human food ingredient is currently being prepared. The bulk sweetener is approved for use in Japan and is being used in a variety of foods. Although a carbohydrate, guar gum hydrolyzate does not contribute to dental caries, does not cause as significant gastrointestinal disturbances as polyols and does not significantly contribute to calories. Thus, this ingredient's use in chewing gum could be a definite improvement.

Guar gum, which is found in the seeds of two leguminous plants, has found extensive uses as a food additive. U.S. Pat. No. 3,843,818 discloses low calorie pastas made with guar gum. In U.S. Pat. No. 3,996,389, guar gum has been disclosed as a stabilizer for ice cream, ice milk and sherbet. Culinary mixes containing guar gum are disclosed in U.S. Pat. No. 3,161,524. A process for producing low odor, low taste guar gums useful in foods is described in U.S. Pat. No. 3,455,899. Use of guar gum in liquid chewing gum and chewing gum with the texture of rice cake is disclosed in Japanese Patent Publications Nos. 85-224449 and 87-146562. Other patents which disclose the use of guar gum are PCT Publication No. 90/14017 and EPO Patent Publication No. 0 324 720. An enzyme treated guar gum is disclosed in U.S. Pat. No. 4,332,894.

Guar gum is a high molecular weight polysaccharide which, when dissolved in water, forms very high viscosity solutions or gels at low concentrations. Due to the molecular weight and resulting high viscosity aqueous solutions, guar gum has found only limited utility as a bulking agent for food.

In order to make guar gum more suitable for foods, it needs to be hydrolyzed to obtain a guar gum hydrolyzate. Guar gum hydrolyzate and its use in foods is disclosed in EPO Patent Publications Nos. 0 449 594 and 0 457 098, and PCT Patent Publication No. WO 93/15116. The use of guar gum hydrolyzate in chewing gum is disclosed in Japanese Patent Publication No. 1993-115247.

An enzymatically hydrolyzed guar gum was described at a seminar given by IBC U.S.A. Conferences Inc. (International Business Communications) in Atlanta, Ga. on Mar. 13–14, 1991. Information on guar gum hydrolyzate is disclosed in a manual from the seminar and is available from IBC U.S.A. Conferences, Inc., 8 Pleasant Street, Bldg. D, South Natick, Mass.

The enzymatically hydrolyzed guar gum is produced by Taiyo Kagaku Co., Ltd. and is being marketed in the U.S. by Sandoz Nutrition Corp. of Minneapolis, Minn. under the trade name Sunfiber or Benefiber.

Guar gum is in a family of materials called galactomannans. These materials are made up of mannose and galactose units. The main chain consists of $(1\rightarrow 4)$-linked $\beta$-D-mannose residues and the side chains of $(1\rightarrow 6)$-linked $\alpha$-D galactose. Locust bean gum is another galactomannan.

Galactomannans themselves are part of a larger group of natural gums. One specific natural gum is not a galactomannan is karaya gum. PCT Publication No. WO 93/15116 discloses a process for hydrolyzing guar gum, locust bean gum and karaya gum, which are characterized as "natural carbohydrate" gums. The hydrolyzates disclosed in the PCT Publication may be useful in a manner similar to Sunfiber, which is a guar gum hydrolyzate.

SUMMARY OF THE INVENTION

Chewing gum products using a natural carbohydrate gum hydrolyzate and methods of making such gum products have been invented. In one embodiment, the natural carbohydrate gum hydrolyzate is used in a rolling compound applied to the chewing gum product. In a second embodiment, the natural carbohydrate gum hydrolyzate is used in a centerfill of a chewing gum product. In a third embodiment, aspartame is used to sweeten the gum composition and the natural carbohydrate gum hydrolyzate is provided in an effective amount to stabilize the aspartame such that after eight weeks of storage at 85° F., at least 5% less aspartame decomposes than would have decomposed if the natural carbohydrate gum hydrolyzate was not included. A natural carbohydrate gum hydrolyzate is also used as an encapsulating agent for high-intensity sweeteners or flavors used in gum compositions. In yet another embodiment, a natural carbohydrate gum hydrolyzate is co-dried from a solution with another sweetener selected from the group consisting of sugar sweeteners, alditol sweeteners and high-intensity sweeteners and used in a gum composition. In still another embodiment, a natural carbohydrate gum hydrolyzate and a plasticizing agent are coevaporated to form a syrup that is used in a gum composition.

Natural carbohydrate gum hydrolyzates, when used according to the present invention, give chewing gum an improved texture, and improved shelf life and unique flavor/sweetness quality. Even though natural carbohydrate gum hydrolyzates have properties similar to sucrose, they are not cariogenic, they contribute to dietary fiber and do not significantly contribute to calories, giving a highly consumer-acceptable chewing gum product.

DETAILED DESCRIPTION OF THE PREFERRED EMBODIMENTS

Figure 1:
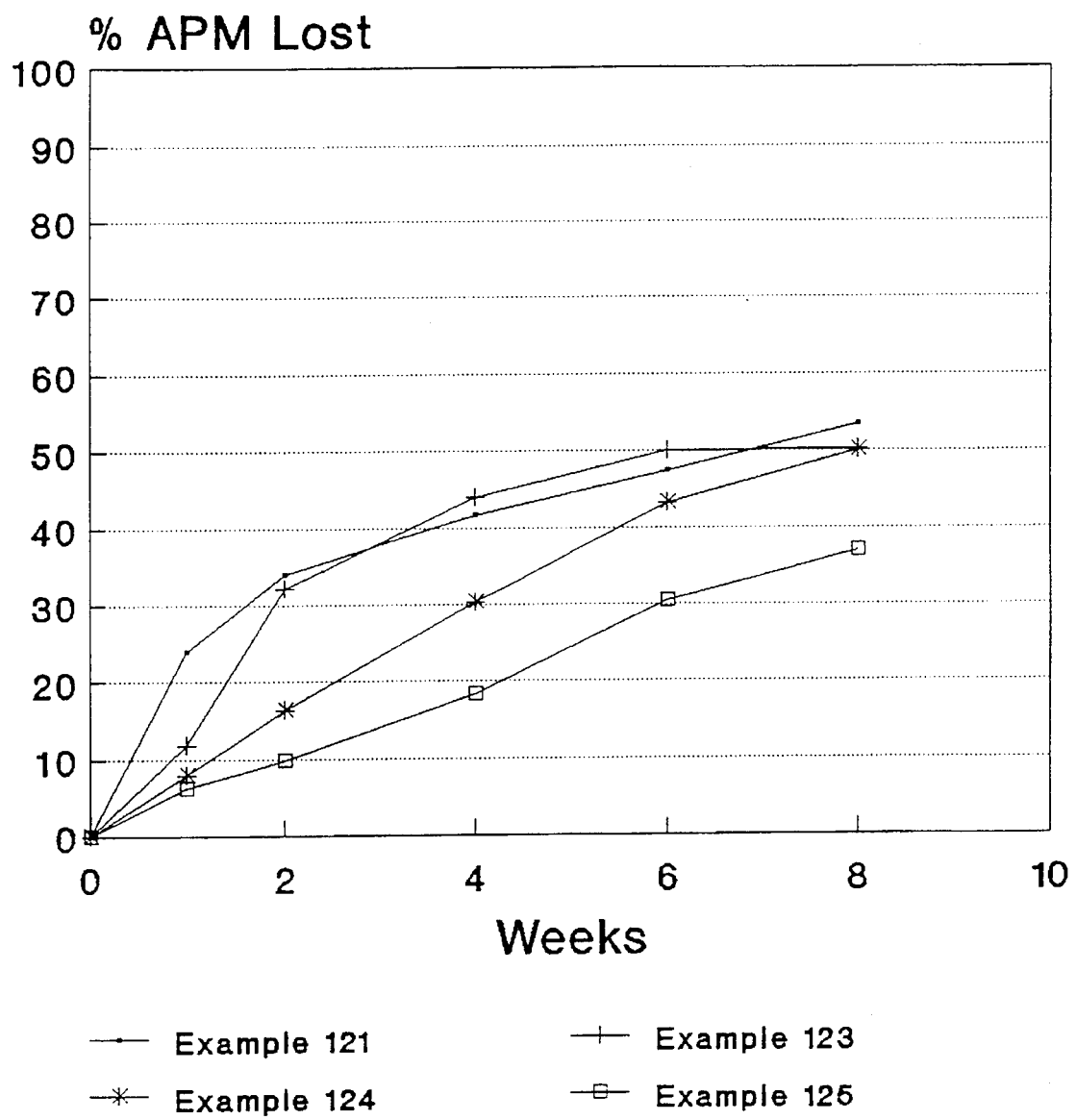
FIG. 1 shows test results of aspartame stability for gum made with liquid sorbitol and guar gum hydrolyzate.

All percents herein are weight percents unless otherwise specified. As used herein, the term "chewing gum" also includes bubble gum and the like.

As noted above, guar gum is obtained from the guar plant, cultivated in India and Pakistan. Guar gum is widely used as a food stabilizer, and is also proved to have excellent fiber properties. However, it is too viscous as a dietary fiber in food applications.

By hydrolyzing guar gum to form the hydrolyzate, either by acid or enzyme treatment, the viscosity is significantly reduced. Sunfiber, enzymatically hydrolyzed guar gum, has a viscosity at least 2,000 times less than that of normal guar gum. Therefore, it has found wide use in food applications in Japan as a new fiber source. Both the enzymatic hydrolyzate, Sunfiber, and the acid hydrolyzate of guar gum are referred to as guar gum hydrolyzate and may be used in chewing gum.

Guar gum and Sunfiber are polymers of mannose and galactose in the ratio of 2:1 and are called galactomannans. The molecular weight of Sunfiber is about ten times lower than that of guar gum. Another galactomannan is locust bean gum, which may also be hydrolyzed and used in chewing gum. Karaya gum, another natural gum, may also be hydrolyzed and used in gum similar to guar gum hydrolyzate.

For Sunfiber, guar gum is hydrolyzed by the enzyme β,D-mannanase from *Aspergillus niger*, is refined by activated carbon, sterilized and spray dried. Sunfiber is a white powder, soluble in cold water, and the solution is colorless, transparent and almost sweetless. The viscosity of a Sunfiber solution is much lower than the viscosity of a guar gum solution. The viscosity of a 10% Sunfiber solution is about 10 cps, as compared to 3,000 cps for a 1% guar gum solution.

The natural carbohydrate gum hydrolyzate may be added to chewing gum in its solid or syrup form. The solubility of guar gum hydrolyzate in water is about 60% at room temperature, but increases with increased temperature. The natural carbohydrate gum hydrolyzate may be used in chewing gum as a texture and flavor modifier, bulking agent, and may improve texture, flavor and shelf life properties. The natural carbohydrate gum hydrolyzate may replace solids like sucrose, dextrose or lactose when used in its powder form, or may replace syrups when used in its liquid or syrup form. At levels of about 0.5% to about 25%, the natural carbohydrate gum hydrolyzate may replace part of the solids in sugar gum or, as a liquid, all or part of the syrup in sugar gum. At higher levels of about 25% to about 90% of the gum formulation, the natural carbohydrate gum hydrolyzate may replace all of the solids in a chewing gum formulation.

Unique chewing gum formulations can be obtained when all bulk sweeteners are replaced with a natural carbohydrate gum hydrolyzate powder and syrup. The relatively low sweetness intensity allows for use of unique flavor combinations, such as the use of a savory and snack flavors. High-intensity sweeteners may be added to increase sweetness to obtain more typical chewing gum formulations. In its powder or liquid form, a sufficient quantity of a natural carbohydrate gum hydrolyzate can stabilize aspartame. At levels above 10%, a natural carbohydrate gum hydrolyzate may replace significant quantities of sucrose and syrup. Because of the resulting lower sweetness, aspartame may be added. It has been found that aspartame is stabilized with guar gum hydrolyzate, especially when the guar gum hydrolyzate is used at a level of 10% or more of the gum. In preferred embodiments, an effective amount of a natural carbohydrate gum hydrolyzate is used in gums with sweetness imparting amounts of aspartame to stabilize the aspartame against decomposition during storage at 85° F. for eight weeks whereby at least 5% less aspartame decomposes into non-sweetening derivatives than would have decomposed if the natural carbohydrate gum hydrolyzate was not included in the gum composition. Because aspartame has such high potency and is used at such low levels, and because of its high cost, even a 5% reduction in degradation is a significant benefit. While the aspartame contemplated will generally be unencapsulated, the term "unencapsulated" as used herein applies to aspartame which, even if treated or partially encapsulated, is still subject to some degradation in the gum formulation.

Although natural carbohydrate gum hydrolyzates have properties like sucrose, their anti-caries properties suggest that they may be used in chewing gum formulations containing non-sugar ingredients. Non-sugar ingredients are polyols such as sorbitol, mannitol, xylitol, lactitol, hydrogenated isomaltulose, maltitol and hydrogenated starch hydrolyzate. These polyols are used in a variety of combinations to develop unique sugarless chewing gum formulations. A natural carbohydrate gum hydrolyzate may be used to replace the individual polyols or combinations of polyols. With partial replacement of one or more polyols, a natural carbohydrate gum hydrolyzate can be used at levels of about 0.5–25%. If the natural carbohydrate gum hydrolyzate replaces a large amount or most of the polyols, this level may be about 25% to about 90% of the gum formulation.

Some sugar-free chewing gum formulations contain high levels of glycerin and are very low in moisture, i.e., less than about 2%. A natural carbohydrate gum hydrolyzate, solids or syrup, may replace part or all of the glycerin used in these types of formulations. At higher moisture levels (more than 2%) in sugar-free gum, a liquid sorbitol (70% sorbitol, 30% water) is used. When using a natural carbohydrate gum hydrolyzate, preferably sorbitol liquid may also be used to obtain soft textured gum formulations. Previous high moisture formulations containing sorbitol liquid were not made with aspartame, since the moisture caused degradation of aspartame. However, when sufficient natural carbohydrate gum hydrolyzate (generally greater than about 10%) is added to a high moisture gum, aspartame is stabilized, and degradation is reduced or eliminated.

HSH and glycerin are preblended and co-evaporated to reduce moisture in some sugar-free gum formulations. Natural carbohydrate gum hydrolyzate solids and/or syrup may be used to replace part or all of the HSH/glycerin blends in chewing gum formulations. Aqueous natural carbohydrate gum hydrolyzate solids and/or syrup may also replace HSH in the preblend with glycerin and be co-evaporated with glycerin to obtain a low moisture, non-crystallizable blend. Combinations of natural carbohydrate gum hydrolyzate solids/syrup with polyols like sorbitol, maltitol, xylitol, lactitol and mannitol in aqueous form may also be blended with glycerin and co-evaporated for use in low-moisture, sugar-free gum.

A natural carbohydrate gum hydrolyzate may be used in gum formulations with HSH without preblending with glycerin and coevaporation. Low levels of moisture are not necessary to prevent degradation of aspartame when a natural carbohydrate gum hydrolyzate is used, so HSH syrups at about 20–30% moisture do not need to be modified to reduce moisture to improve aspartame stability.

In a similar manner, natural carbohydrate gum hydrolyzate solids/syrup preblended in glycerin and co-evaporated may be used in conventional sugar chewing gum formulations. A natural carbohydrate gum hydrolyzate may be combined with other sugars like dextrose, sucrose, lactose, maltose, invert sugar, fructose and corn syrup solids to form a liquid mix to be blended with glycerin and co-evaporated. Natural carbohydrate gum hydrolyzate solids/syrup may also be mixed with conventional syrup and blended with glycerin and co-evaporated for use in a sugar chewing gum formulation.

Natural carbohydrate gum hydrolyzate bulk sweeteners may be co-dried with a variety of sugars such as sucrose, dextrose, lactose, fructose and corn syrup solid, and used in a sugar-containing gum formulation. Natural carbohydrate gum hydrolyzates may also be co-dried with a variety of polyols, such as sorbitol, mannitol, xylitol, maltitol, hydrogenated isomaltulose and hydrogenated starch hydrolyzate, and used in a sugar-free gum formulation. Co-drying refers to methods of co-crystallization and co-precipitation of a natural carbohydrate guar gum hydrolyzate with other sugars and polyols, as well as co-drying by encapsulation, agglomeration and absorption with other sugars and polyols.

Co-drying by encapsulation, agglomeration and absorption can also include the use of encapsulating and agglomerating agents. A natural carbohydrate gum hydrolyzate may be mixed with other sugars or polyols prior to being redried by encapsulation or agglomeration, or may be used alone with the encapsulating and agglomerating agents. These agents modify the physical properties of the bulk sweetener and control its release from chewing gum. Since natural carbohydrate gum hydrolyzates are highly soluble in water as noted earlier, controlling the release of the natural carbohydrate gum hydrolyzate modifies the texture and flavor of the chewing gum.

The three methods of use to obtain a delayed release of bulk sweetener are: (1) encapsulation by spray drying, fluid-bed coating, spray chilling and coacervation to give full or partial encapsulation, (2) agglomeration to give partial encapsulation and (3) fixation or entrapment/absorption, which also gives partial encapsulation. These three methods, combined in any usable manner which physically isolates the bulk sweetener, reduces its dissolvability or slows down the release of bulk sweetener, are included in this invention.

Natural carbohydrate gum hydrolyzates may act as encapsulating or agglomerating agents. Natural carbohydrate gum hydrolyzates may also be used to absorb other ingredients. Natural carbohydrate gum hydrolyzates may be able to encapsulate, agglomerate or entrap/absorb flavors and high intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with a natural carbohydrate gum hydrolyzate may improve the shelf life of the sweetener.

A natural carbohydrate gum hydrolyzate may be used with other bulk sweeteners and in combinations that give unique properties. A natural carbohydrate gum hydrolyzate may be co-dried by various delayed release methods noted above with other bulk sweeteners like isomaltulose, sucrose, dextrose, lactose, maltose, fructose, corn syrup solids, sorbitol, mannitol, xylitol, maltitol, hydrogenated isomaltulose and hydrogenated starch hydrolyzate for use in sugar and sugar-free chewing gum. Ingredients, including flavors, co-dried, encapsulated, agglomerated or absorbed on guar gum hydrolyzate may show faster release. However, encapsulation of flavors with a natural carbohydrate gum hydrolyzate may improve the shelf-life of the flavor ingredient, like other bulking agents.

Other methods of treating the natural carbohydrate gum hydrolyzate bulk sweetener to physically isolate the sweetener from other chewing gum ingredients may also have some effect on its release rate and its effect on chewing gum flavor and texture. The bulk sweetener may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The bulk sweetener is dissolved in the center-fill liquid and the amount of bulk sweetener added to the center-fill liquid may be about 0.1% to about 20% by weight of the entire chewing gum formula. This method of using a natural carbohydrate gum hydrolyzate bulk sweetener in chewing gum can allow for a lower usage level of the bulk sweetener, can give the bulk sweetener a smooth release rate, and can reduce or eliminate any possible reaction of the bulk sweetener with gum base, flavor components or other components, yielding improved shelf stability.

Another method of isolating the natural carbohydrate gum hydrolyzate bulk sweetener from other chewing gum ingredients is to add the natural carbohydrate gum hydrolyzate to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises a natural carbohydrate gum hydrolyzate bulk sweetener alone or in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of the chewing gum composition. The amount of natural carbohydrate gum hydrolyzate bulk sweetener added to the rolling compound is about 0.5% to 100% of the rolling compound, or about 0.005% to about 5% of the chewing gum composition. This method of using a natural carbohydrate gum hydrolyzate bulk sweetener in the chewing gum can allow a lower usage level of the bulk sweetener, can give the bulk sweetener a more controlled release rate, and can reduce or eliminate any possible reaction of the bulk sweetener with gum base, flavor components or other components, yielding improved shelf stability.

The previously described encapsulated, agglomerated or absorbed natural carbohydrate gum hydrolyzate bulk sweetener may readily be incorporated into a chewing gum composition. The remainder of the chewing gum ingredients are noncritical to the present invention. That is, the coated particles of bulk sweetener can be incorporated into conventional chewing gum formulations in a conventional manner. The natural carbohydrate gum hydrolyzate bulk sweeteners may be used in a sugar-free or sugar chewing gum to modify the sweetness thereof. Higher levels of a natural carbohydrate gum hydrolyzate will reduce sweetness, thus allowing for its use in non-sweet flavored chewing gums such as snack flavor and savory flavors.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, butyl rubber (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and cocoa butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Emulsifiers, which sometimes also have plastisizing properties, include glycerol monostearate, lecithin and glycerol triacetate. Further, gum bases may also contain optional ingredients such as antioxidants, colors and flavors.

According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum. The present invention contemplates employing any commercially acceptable gum base.

The water-soluble portion of the chewing gum may further comprise softeners, sweeteners, flavoring agents and combinations thereof. The sweeteners often fulfill the role of bulking agents in the gum. As used herein, the term "bulking and sweetening agent" comprises not only those ingredients that perform both bulking and sweetening functions, but also combinations of ingredients that together perform the functions, such as combinations of low sweetness bulking agents and high-intensity sweeteners.

Sugarless sweeteners include sorbitol, mannitol, xylitol, hydrogenated starch hydrolyzates, maltitol and the like, alone or in combination. In sugar gum, typical bulking agents include sucrose, dextrose, maltose, dextrin, dried inert sugar, fructose, levulose, galactose, corn syrup solids and the like, alone or in combination. High-intensity sweeteners include aspartame, alitame, dihydrocalcones, sucralose, cyclamate, saccharin, acesulfame K, glycyrrhizin, thaumatin, monellin, stevioside and the like, alone or in combination. The bulking and sweetening agents typically comprise about 5% to about 90% of the gum composition, preferably from about 20% to about 80%, and most preferably about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin and combinations thereof. Further, aqueous sweetener solutions such as those containing sorbitol, hydrogenated starch hydrolyzate, corn syrup and combinations thereof may be used as softeners and binding agents in gum.

As mentioned above, the natural carbohydrate gum hydrolyzate solids/syrup bulk sweetener of the present invention may be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The natural carbohydrate gum hydrolyzate solids/syrup bulk sweetener of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzate, maltitol and the like, alone or in any combination.

Depending on the particular sweetness release profile and shelf-stability needed, the natural carbohydrate gum hydrolyzate solid/syrup bulk sweeteners of the present invention can also be used in combination with coated or uncoated high-intensity sweeteners or with high-intensity sweeteners coated with other materials and by other techniques.

A flavoring agent may be present in the chewing gum in an amount within the range of from about 0.1 to about 10.0 weight percent, and preferably from about 0.5 to about 3.0 weight percent of the gum. The flavoring agents may comprise essential oils, synthetic flavors or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

The formulas listed in Table 1 comprise various sugar-type formulas in which guar gum hydrolyzate can be added to gum after it is dissolved in water and mixed with various aqueous solvents.

TABLE 1

|  | EX. 1 | EX. 2 | EX. 3 | EX. 4 | EX. 5 | EX. 6 | EX. 7 | EX. 8 |
|---|---|---|---|---|---|---|---|---|
| SUGAR | 55.6 | 56.6 | 55.6 | 47.0 | 53.0 | 53.0 | 55.5 | 47.0 |
| BASE | 19.2 | 19.2 | 19.2 | 19.2 | 19.2 | 19.2 | 19.2 | 19.2 |
| CORN SYRUP | 12.8 | 1.8 | 8.8 | 2.8 | 6.8 | 6.8 | 0.0 | 2.8 |
| PEPPERMINT FLAVOR | 0.9 | 0.9 | 0.9 | 0.9 | 0.9 | 0.9 | 0.9 | 0.9 |
| GLYCERIN | 1.4 | 1.4 | 1.4 | 0.0 | 0.0 | 0.0 | 1.4 | 0.0 |
| LIQUID/SUNFIBER BLEND | 10.0 | 20.0 | 14.0 | 30.0 | 20.0 | 20.0 | 22.9 | 30.0 |
| ASPARTAME | 0.1 | 0.1 | 0.1 | 0.1 | 0.1 | 0.1 | 0.1 | 0.1 |

Example 1

Sunfiber powder can be added directly to the gum.

Example 2

An 80 gram portion of Sunfiber can be dissolved in 120 grams of water at 40° C., making a 40% solution, and added to gum.

Example 3

Sunfiber syrup at 50% solids can be added directly to the gum.

Example 4

A blend of 80 grams of Sunfiber and 120 grams of water is mixed at 40° C. To this is added 100 grams of glycerin to give a mixture of 27% Sunfiber, 40% water and 33% glycerin, and added to gum.

Example 5

To 140 grams of Sunfiber syrup at 50% solids is added 60 grams of glycerin to give a 70% Sunfiber syrup with 30% glycerin, and added to gum.

Example 6

To 140 grams of Sunfiber syrup of 50% solids is added 60 grams of propylene glycol, giving a 70% Sunfiber syrup with 30% propylene glycol, and added to gum.

Example 7

To 140 grams of Sunfiber syrup at 50% solids is added 89 grams of corn syrup and blended, giving a mixture of 61% Sunfiber syrup and 39% corn syrup.

Example 8

To a 200 gram quantity of corn syrup is added 100 grams of glycerin. To this mixture is added 75 grams of Sunfiber and blended at 50° C. This mixture is added to gum.

In the next examples of sugar gum formulations, guar gum hydrolyzate can be dissolved in water and emulsifiers can be added to the aqueous solution. Example solutions can be prepared by dissolving 15 grams of guar gum hydrolyzate in 70 grams water and adding 15 grams of emulsifiers of various hydrophilic-lipophilic balance (HLB) values to the solution. The mixtures can then be used in the following formulas. (Note: The aqueous solution of Example 9 does not contain any emulsifier.)

TABLE 2

|  | EX. 9 | EX. 10 | EX. 11 | EX. 12 | EX. 13 | EX. 14 |
|---|---|---|---|---|---|---|
| SUGAR | 50.7 | 50.7 | 50.7 | 50.7 | 50.7 | 50.7 |
| BASE | 19.2 | 19.2 | 19.2 | 19.2 | 19.2 | 19.2 |
| CORN SYRUP | 12.8 | 12.8 | 12.8 | 12.8 | 12.8 | 12.8 |
| GLYCERIN | 1.4 | 1.4 | 1.4 | 1.4 | 1.4 | 1.4 |
| DEXTROSE MONOHYDRATE | 9.9 | 9.9 | 9.9 | 9.9 | 9.9 | 9.9 |
| PEPP. FLAVOR | 0.9 | 0.9 | 0.9 | 0.9 | 0.9 | 0.9 |
| ASPARTAME | 0.1 | 0.1 | 0.1 | 0.1 | 0.1 | 0.1 |
| BULK SWEETENER/EMULSIFIER/WATER MIXTURE | 5.0 | 5.0 | 5.0 | 5.0 | 5.0 | 5.0 |
| EMULSIFIER | NONE | HLB = 2 | HLB = 4 | HLB = 6 | HLB = 9 | HLB = 12 |

Examples 15–20

The same as the formulations made in Examples 9–14, respectively, except that the flavor can be mixed together with the aqueous bulk sweetener solution before adding the mixture to the gum batch.

The following Tables 3 through 10 give examples of gum formulations demonstrating formula variations in which guar gum hydrolyzate, in the form of Sunfiber syrup or powder, may be used. Formulas with high levels of guar gum hydrolyzate may also contain aspartame (APM), which is stabilized with guar gum hydrolyzate.

Examples 21–25 in Table 3 demonstrate the use of guar gum hydrolyzate in low-moisture sugar formulations having less than 2% theoretical moisture:

TABLE 3

|  | EX. 21 | EX. 22 | EX. 23 | EX. 24 | EX. 25 |
|---|---|---|---|---|---|
| SUGAR | 57.9 | 53.9 | 46.9 | 23.0 | 0.0 |
| GUM BASE | 19.2 | 19.2 | 19.2 | 19.2 | 19.2 |
| CORN SYRUP[a] | 6.0 | 6.0 | 6.0 | 6.0 | 4.0 |
| DEXTROSE MONOHYDRATE | 10.0 | 10.0 | 10.0 | 10.0 | 10.0 |
| LACTOSE | 0.0 | 0.0 | 0.0 | 5.0 | 5.0 |
| GLYCERIN[b] | 5.0 | 5.0 | 6.9 | 10.7 | 10.6 |
| FLAVOR | 0.9 | 0.9 | 0.9 | 0.9 | 0.9 |
| SUNFIBER | 1.0 | 5.0 | 10.0 | 25.0 | 50.0 |
| ASPARTAME | — | — | 0.1 | 0.2 | 0.3 |

[a]Corn syrup is evaporated to 85% solids, 15% moisture.
[b]Glycerin and syrup may be blended and co-evaporated.

Examples 26–30 in Table 4 demonstrate the use of guar gum hydrolyzate in medium-moisture sugar formulations having about 2% to about 5% moisture.

TABLE 4

|  | EX. 26 | EX. 27 | EX. 28 | EX. 29 | EX. 30 |
|---|---|---|---|---|---|
| SUGAR | 52.5 | 46.5 | 40.5 | 20.0 | 0.0 |
| GUM BASE | 19.2 | 19.2 | 19.2 | 19.2 | 19.2 |
| CORN SYRUP[a] | 15.0 | 15.0 | 14.9 | 18.3 | 18.2 |
| DEXTROSE MONOHYDRATE | 10.0 | 10.0 | 10.0 | 10.0 | 5.0 |
| GLYCERIN[b] | 1.4 | 3.4 | 4.4 | 6.4 | 6.4 |
| FLAVOR | 0.9 | 0.9 | 0.9 | 0.9 | 0.9 |
| SUNFIBER | 1.0 | 5.0 | 10.0 | 25.0 | 50.0 |
| ASPARTAME | — | — | 0.1 | 0.2 | 0.3 |

[a]Corn syrup is evaporated to 85% solids, 15% moisture.
[b]Glycerin and syrup may be blended and co-evaporated.

Examples 31–35 in Table 5 demonstrate the use of guar gum hydrolyzate in high-moisture sugar formulations having more than about 5% moisture.

TABLE 5

|  | EX. 31 | EX. 32 | EX. 33 | EX. 34 | EX. 35 |
|---|---|---|---|---|---|
| SUGAR | 50.0 | 44.0 | 38.0 | 20.0 | 0.0 |
| GUM BASE | 24.0 | 24.0 | 24.0 | 24.0 | 24.0 |
| CORN SYRUP | 24.0 | 24.0 | 24.0 | 24.4 | 19.3 |
| GLYCERIN | 0.0 | 2.0 | 2.9 | 5.4 | 5.4 |
| FLAVOR | 1.0 | 1.0 | 1.0 | 1.0 | 1.0 |
| SUNFIBER | 1.0 | 5.0 | 10.0 | 25.0 | 50.0 |
| ASPARTAME | — | — | 0.1 | 0.2 | 0.3 |

Examples 36–40 in Table 6 and Examples 41–50 in Tables 7 and 8 demonstrate the use of guar gum hydrolyzate in low- and high-moisture gums that are sugar-free. Low-moisture gums have less than about 2% moisture, and high-moisture gums have greater than 2% moisture.

TABLE 6

|  | EX. 36 | EX. 37 | EX. 38 | EX. 39 | EX. 40 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| MANNITOL | 12.0 | 12.0 | 12.0 | 12.0 | 13.0 |
| GLYCERIN | 10.0 | 9.9 | 9.8 | 9.7 | 9.6 |
| FLAVOR | 1.5 | 1.5 | 1.5 | 1.5 | 1.5 |
| SUNFIBER | 1.0 | 5.0 | 10.0 | 25.0 | 50.0 |
| ASPARTAME | — | 0.1 | 0.2 | 0.3 | 0.4 |

TABLE 7

|  | EX. 41 | EX. 42 | EX. 43 | EX. 44 | EX. 45 |
|---|---|---|---|---|---|
| BASE | 25.5 | 25.5 | 25.5 | 25.5 | 25.5 |
| SORBITOL | 50.0 | 46.0 | 39.0 | 23.0 | 0.0 |
| SORBITOL LIQUID* | 10.0 | 10.0 | 10.0 | 10.0 | 11.0 |
| MANNITOL | 10.0 | 10.0 | 10.0 | 10.0 | 5.0 |
| GLYCERIN | 2.0 | 1.9 | 3.8 | 4.7 | 6.6 |
| FLAVOR | 1.5 | 1.5 | 1.5 | 1.5 | 1.5 |
| SUNFIBER | 1.0 | 5.0 | 10.0 | 25.0 | 50.0 |
| ASPARTAME | — | 0.1 | 0.2 | 0.3 | 0.4 |

*Liquid sorbitol contains 70% sorbitol, 30% water.

TABLE 8

|  | EX. 46 | EX. 47 | EX. 48 | EX. 49 | EX. 50 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| HSH SYRUP* | 10.0 | 10.0 | 10.0 | 10.0 | 10.0 |
| MANNITOL | 8.0 | 7.9 | 7.8 | 7.7 | 8.6 |
| GLYCERIN** | 4.0 | 4.0 | 4.0 | 4.0 | 4.0 |
| FLAVOR | 1.5 | 1.5 | 1.5 | 1.5 | 1.5 |
| SUNFIBER | 1.0 | 5.0 | 10.0 | 25.0 | 50.0 |
| ASPARTAME | — | 0.1 | 0.2 | 0.3 | 0.4 |

*Lycasin brand hydrogenated starch hydrolyzate syrup
**Glycerin and HSH syrup may be blended or co-evaporated.

Table 9 shows sugar chewing formulations that can be made with guar gum hydrolyzate and various other types of sugars.

TABLE 9

|  | EX. 51 | EX. 52 | EX. 53 | EX. 54 | EX. 55 | EX. 56 |
|---|---|---|---|---|---|---|
| GUM BASE | 19.2 | 19.2 | 19.2 | 19.2 | 19.2 | 19.2 |
| SUCROSE | 44.4 | 21.2 | 39.4 | 16.2 | 29.4 | 16.2 |
| GLYCERIN | 1.4 | 4.4 | 1.4 | 4.4 | 1.4 | 4.4 |
| CORN SYRUP | 14.0 | 14.0 | 14.0 | 14.0 | 14.0 | 14.0 |
| DEXTROSE | 5.0 | 5.0 | — | — | 10.0 | 5.0 |
| LACTOSE | 5.0 | 5.0 | 10.0 | 10.0 | — | — |
| FRUCTOSE | 5.0 | 5.0 | 10.0 | 10.0 | 10.0 | 5.0 |
| INVERT SUGAR | — | — | — | — | 10.0 | 10.0 |
| MALTOSE | — | — | — | — | — | — |
| CORN SYRUP SOLIDS | — | — | — | — | — | — |
| PEPPERMINT FLAVOR | 0.9 | 0.9 | 0.9 | 0.9 | 0.9 | 0.9 |
| SUNFIBER | 5.0 | 25.0 | 5.0 | 25.0 | 5.0 | 25.0 |
| ASPARTAME | 0.1 | 0.3 | 0.1 | 0.3 | 0.1 | 0.3 |

|  | EX. 57 | EX. 58 | EX. 59 | EX. 60 | EX. 61 | EX. 62 |
|---|---|---|---|---|---|---|
| GUM BASE | 19.2 | 19.2 | 19.2 | 19.2 | 19.2 | 19.2 |
| SUCROSE | 29.4 | 16.2 | 29.4 | 16.2 | 37.4 | 19.2 |
| GLYCERIN | 1.4 | 4.4 | 1.4 | 4.4 | 1.4 | 4.4 |

TABLE 9-continued

| CORN SYRUP | 14.0 | 14.0 | 14.0 | 14.0 | 11.0 | 11.0 |
|---|---|---|---|---|---|---|
| DEXTROSE | 10.0 | 5.0 | 10.0 | 5.0 | 10.0 | 5.0 |
| LACTOSE | — | — | — | — | — | — |
| FRUCTOSE | 10.0 | 5.0 | 10.0 | 5.0 | 5.0 | 5.0 |
| INVERT SUGAR | 10.0 | 10.0 | — | — | 5.0 | 5.0 |
| MALTOSE | — | — | 10.0 | 10.0 | — | — |
| CORN SYRUP SOLIDS | — | — | — | — | 5.0 | 5.0 |
| PEPPERMINT FLAVOR | 0.9 | 0.9 | 0.9 | 0.9 | 0.9 | 0.9 |
| SUNFIBER | 5.0 | 25.0 | 5.0 | 25.0 | 5.0 | 25.0 |
| ASPARTAME | 0.1 | 0.3 | 0.1 | 0.3 | 0.1 | 0.3 |

Any of the sugars may be combined with guar guam hydrolyzate and co-dried to form unique combinations such as:

Example 63

Dextrose and Sunfiber can be dissolved in water in a 2:1 ratio dextrose: guar gum hydrolyzate and co-dried or co-precipitated and used in the formulas in Table 9.

Example 64

Sunfiber and sucrose can be dissolved in water in a 1:1 ratio and co-dried or co-precipitated and used in the formulas in Table 9.

Example 65

Sunfiber, sucrose and dextrose can be dissolved in water in a 1:1:1 ratio and co-dried or co-precipitated and used in the formulas in Table 9.

Example 66

Sunfiber, sucrose, dextrose and fructose can be dissolved in water at 25% of each ingredient and co-dried and used in the formulas in Table 9.

Example 67

Sunfiber, dextrose, fructose and lactose can be dissolved in water at 25% of each ingredient and co-dried and used in the formulas in Table 9.

Example 68

Sunfiber, dextrose, maltose and corn syrup solids can be dissolved in water at 25% of each ingredient and co-dried and used in the formulas in Table 9.

Example 69

Sunfiber, sucrose, dextrose, maltose and fructose can be dissolved in water at 20% of each ingredient and co-dried and used in the formulas in Table 9.

Multiple combinations of guar gum hydrolyzate with other sugars can be made in solution to form liquid concentrates that do not need to be co-dried, such as:

Example 70

Sunfiber, corn syrup and glycerin can be dissolved in water at a ratio of 1:1:1, evaporated to a thick syrup and used in the formulas in Table 9.

Example 71

Sunfiber, dextrose, fructose and invert syrup may be dissolved in water at 25% of each ingredient and evaporated to a thick syrup and used in the formulas in Table 9.

Example 72

Sunfiber, dextrose, maltose and corn syrup solids may be dissolved in water at 25% of each component and evaporated to a thick syrup and used in the formulas in Table 9.

Example 73

Glycerin is added to Example 71 at a ratio of 4:1 syrup to glycerin and evaporated to a thick syrup and used in the formulas in Table 9.

Example 74

Glycerin is added to Example 72 at a ratio of 2:1 syrup to glycerin and evaporated to a thick syrup and used in the formulas in Table 9.

Table 10 shows chewing gum formulations that are free of sugar. These formulations can use a wide variety of other non-sugar polyols.

TABLE 10

| | EX. 75 | EX. 76 | EX. 77 | EX. 78 | EX. 79 | EX. 80 |
|---|---|---|---|---|---|---|
| GUM BASE | 25.5 | 25.5 | 25.5 | 25.5 | 25.5 | 25.5 |
| GLYCERIN | 1.9 | 3.7 | 1.9 | 3.7 | 1.9 | 4.7 |
| SORBITOL | 44.0 | 12.0 | 34.0 | 7.0 | 28.0 | — |
| MANNITOL | — | 10.0 | 10.0 | 10.0 | 10.0 | 3.0 |
| SORBITOL LIQUID | 17.0 | 17.0 | — | — | — | — |
| LYCASIN | — | — | 17.0 | 12.0 | 8.0 | 10.0 |
| HSH SYRUP | | | | | | |
| MALTITOL | — | — | — | 10.0 | — | — |
| XYLITOL | — | — | — | — | 15.0 | 15.0 |
| LACTITOL | — | — | — | — | — | — |
| HYDROGENATED ISOMALTULOSE | — | — | — | — | — | — |
| FLAVOR | 1.5 | 1.5 | 1.5 | 1.5 | 1.5 | 1.5 |
| SUNFIBER | 10.0 | 30.0 | 10.0 | 30.0 | 10.0 | 40.0 |
| ASPARTAME | 0.1 | 0.3 | 0.1 | 0.3 | 0.1 | 0.3 |

| | EX. 81 | EX. 82 | EX. 83 | EX. 84 | EX. 85 | EX. 86 |
|---|---|---|---|---|---|---|
| GUM BASE | 25.5 | 25.5 | 25.5 | 25.5 | 25.5 | 25.5 |
| GLYCERIN | 7.9 | 7.7 | 7.9 | 7.7 | 7.7 | 4.7 |
| SORBITOL | 32.0 | 7.0 | 22.0 | 5.0 | 5.0 | — |
| MANNITOL | 8.0 | 8.0 | 8.0 | — | — | — |
| SORBITOL LIQUID | 5.0 | — | — | — | — | — |
| LYCASIN HSH SYRUP | — | 5.0 | 5.0 | 5.0 | 10.0 | 10.0 |
| MALTITOL | — | 5.0 | — | — | — | — |
| XYLITOL | — | — | — | 15.0 | — | — |
| LACTITOL | 10.0 | 10.0 | 10.0 | — | — | — |
| HYDROGENATED ISOMALTULOSE | — | — | 10.0 | 10.0 | 25.0 | 18.0 |
| FLAVOR | 1.5 | 1.5 | 1.5 | 1.5 | 1.5 | 1.5 |
| SUNFIBER | 10.0 | 30.0 | 10.0 | 30.0 | 25.0 | 40.0 |

TABLE 10-continued

| | | | | | | |
|---|---|---|---|---|---|---|
| ASPAR-TAME | 0.1 | 0.3 | 0.1 | 0.3 | 0.3 | 0.3 |

Any of the polyols can be combined with guar gum hydrolyzate and co-dried to form unique combinations, such as:

Example 87

Sunfiber and sorbitol can be dissolved in water in a ratio of 2:1 sorbitol: guar gum hydrolyzate, co-dried, and used in formulas in Table 10.

Example 88

Sunfiber, sorbitol and mannitol can be dissolved in water at a ratio of 1:1:1, co-dried, and used in appropriate formulas in Table 10.

Example 89

Sunfiber, mannitol and xylitol can be dissolved in water at a ratio of 1:1:1, co-dried, and used in appropriate formulas in Table 10.

Example 90

Sunfiber, sorbitol and lactitol can be dissolved in water at a ratio of 1:1:1, co-dried, and used in appropriate formulas in Table 10.

Example 91

Sunfiber, hydrogenated isomaltulose and sorbitol can be dissolved in water at a ratio of 1:1:1, co-dried, and used in appropriate formulas in Table 10.

Example 92

Sunfiber and hydrogenated isomaltulose can be dissolved in water at a ratio of 1:1, co-dried, and used in appropriate formulas in Table 10.

Example 93

Sunfiber, sorbitol, maltitol and xylitol may be blended at 25% of each ingredient and dissolved in water, co-dried, and used in appropriate formulas in Table 10.

Multiple combinations of guar gum hydrolyzate with the various polyols can be made in solution to form liquid concentrates that do not need to be co-dried, such as:

Example 94

Sunfiber, sorbitol, maltitol and Lycasin HSH syrup may be dissolved in water at 25% of each ingredient, evaporated to a thick syrup and used in the appropriate formulas in Table 10.

Example 95

Sunfiber, xylitol, sorbitol and Lycasin HSH syrup can be dissolved in water at 25% of each ingredient, evaporated to a thick syrup, and used in the formulas in Table 10.

Example 96

Sunfiber, sorbitol, lactitol and Lycasin HSH syrup can be dissolved in water at 25% of each ingredient, evaporated to a thick syrup, and used in the formulas in Table 10.

Example 97

Sunfiber, Lycasin HSH syrup and glycerin can be dissolved in water at a ratio of 1:1:1, evaporated to a thick syrup and used in the formulas in Table 10.

Example 98

Glycerin is added to Example 94 at a ratio of 4:1 syrup to glycerin, evaporated to a thick syrup and used in formulas in Table 10.

Example 99

Glycerin is added to Example 95 at a ratio of 4:1 syrup to glycerin, evaporated to a thick syrup and used in the formulas in Table 10.

Example 100

Glycerin is added to Example 101 at a ratio of 4:1 syrup to glycerin, evaporated to a thick syrup and used in formulas in Table 10.

Other high-intensity sweeteners such as acesulfame K, or the salts of acesulfame, cyclamate and its salts, saccharin and its salts, alitame, sucralose, thaumatin, monellin, dihydrochalcones, stevioside, glycyrrhizin, and combinations thereof may be used in any of the Examples listed in Tables 3, 4, 5, 6, 7, 8, 9 and 10. Since guar gum hydrolyzate has less sweetness than some of the other sugars used in sugar gum, and some of the polyols in sugar-free gum, a high-intensity sweetener may be needed to obtain the proper level of sweetness.

High-intensity sweeteners may also be modified to control their release in chewing gum formulations containing guar gum hydrolyzate. This can be controlled by various methods of encapsulation, agglomeration, absorption, or a combination of methods to obtain either a fast or slow release of the sweetener. Sweetener combinations, some of which may be synergistic, may also be included in the gum formulations containing guar gum hydrolyzate. Guar gum hydrolyzate may also be used to encapsulate, agglomerate, absorb or entrap any high intensity sweetener to control its release.

The following examples show the use of high-intensity sweeteners in chewing gum formulations with guar gum hydrolyzate.

Example 101

Alitame at a level of 0.03% may be added to any of the formulas in Tables 3 through 10 by replacing 0.03% of the Sunfiber.

Example 102

Sucralose at a level of 0.07% may be added to any of the formulas in Tables 3 through 10 by replacing 0.07% of the Sunfiber.

Example 103

Thaumatin at a level of 0.02% may be added to any of the formulas in Tables 3 through 10 by replacing 0.02% of the Sunfiber.

Example 104

Glycyrrhizin at a level of 0.4% may be added to any of the formulas in Tables 3 through 10 by replacing 0.4% of the Sunfiber.

High-intensity sweeteners may also be combined with other high-intensity sweeteners, with or without encapsulation, agglomeration or absorption, and used in chewing gums of the present invention. Examples are:

Example 105

Aspartame and acesulfame K at a 1:1 ratio may be added to any of the formulas in Tables 3 through 10 at a level of 0.15% by replacing 0.15% of the Sunfiber.

Example 106

Aspartame and alitame at a ratio of 9:1 aspartame:alitame may be added to any of the formulas in Tables 3 through 10 at a level of 0.2% by replacing 0.2% of the Sunfiber.

Example 107

Aspartame and thaumatin at a ratio of 9:1 aspartame:thaumatin can be added to any of the formulas in Tables 3 through 10 at a level of 0.1% by replacing 0.1% of the Sunfiber.

Example 108

Sucralose and alitame in a ratio of 3:1 sucralose:alitame can be added to any of the formulas in Tables 3 through 10 at a level of 0.1% by replacing 0.1% of the Sunfiber.

Example 109

Alitame and glycyrrhizin in a ratio of 1:12 alitame:glycyrrhizin can be added to any of the formulas in Tables 3 through 10 at a level of 0.2% by replacing 0.2% of the Sunfiber.

Example 110

Aspartame and glycyrrhizin in a ratio of 1:14 aspartame:glycyrrhizin can be added to any of the formulas in Tables 3 through 10 at a level of 0.3% by replacing 0.3% of the Sunfiber.

As discussed above, the various types of guar gum hydrolyzate ingredients that are available are Sunfiber as both a powder and in clear syrup form. These materials may be used as the exclusive bulking agent and/or sweetener in a variety of chewing gum formulations, as in Tables 11 and 12. The formulas with guar gum hydrolyzate and aspartame will show improved aspartame stability.

TABLE 11

|  | EX. 111 | EX. 112 | EX. 113 | EX. 114 | EX. 115 |
|---|---|---|---|---|---|
| GUM BASE | 19.2 | 25.5 | 25.5 | 25.5 | 40.0 |
| GLYCERIN | 2.0 | 2.0 | 7.0 | 7.0 | 2.0 |
| SUNFIBER POWDER | 57.8 | 41.0 | 46.0 | 36.0 | 35.5 |
| SUNFIBER SYRUP* | 20.0 | 30.0 | 20.0 | 30.0 | 20.0 |
| FLAVOR | 1.0 | 1.5 | 1.5 | 1.5 | 2.5 |

*Sunfiber powder and Sunfiber syrup may also be preblended with glycerin and coevaporated to reduce moisture.

TABLE 12

|  | EX. 116 | EX. 117 | EX. 118 | EX. 119 | EX. 120 |
|---|---|---|---|---|---|
| GUM BASE | 25.5 | 25.5 | 25.5 | 50.0 | 70.0 |
| GLYCERIN | 2.0 | 2.0 | 7.0 | 12.0 | 8.0 |
| SUNFIBER POWDER* | 31.0 | 21.0 | 26.0 | 25.5 | 10.0 |
| SUNFIBER SYRUP* | 40.0 | 50.0 | 40.0 | 10.0 | 9.0 |
| FLAVOR | 1.5 | 1.5 | 1.5 | 2.5 | 3.0 |

*Sunfiber powder and Sunfiber syrup may also be preblended with glycerin and coevaporated to reduce moisture.

The formulations in Tables 11 and 12 do not contain other sugars or polyols. These formulations will give unique texture and flavor attributes. These formulations may also contain high-intensity, artificial sweeteners, from about 0.02% to about 0.1% for sweeteners like alitame, thaumatin and dihydrochalcones, and from about 0.1% to about 0.3% for sweeteners like aspartame, sucralose, acesulfame and saccharin. The formulations in Tables 11 and 12 without the other types of sugars and polyols will also have good non-cariogenic and low caloric properties.

Guar gum hydrolyzate may also be co-dried with high-intensity, artificial sweeteners by spray drying, fluid bed coating, spray congealing or agglomeration, and used in the formulations in Tables 11 and 12 at active levels of the various high-intensity sweeteners noted above.

Examples 121–127

The following gum formulations were made:

|  | EX. 121 | EX. 122 | EX. 123 | EX. 124 | EX. 125 | EX. 126 | EX. 127 |
|---|---|---|---|---|---|---|---|
| BASE | 24.7 | 24.7 | 24.7 | 24.7 | 24.7 | 24.7 | 24.7 |
| SORBITOL | 50.0 | 50.0 | 45.0 | 35.0 | 10.0 | 35.0 | 10.0 |
| MANNITOL | 9.4 | 7.0 | 9.4 | 9.4 | 9.4 | 7.0 | 7.0 |
| GLYCERIN | 2.0 | 2.0 | 2.0 | 2.0 | 2.0 | 2.0 | 2.0 |
| LECITHIN | 0.2 | 0.2 | 0.2 | 0.2 | 0.2 | 0.2 | 0.2 |
| PEPPERMINT FLAVOR | 1.4 | 1.4 | 1.4 | 1.4 | 1.4 | 1.4 | 1.4 |
| ASPARTAME | 0.3 | 0.3 | 0.3 | 0.3 | 0.3 | 0.3 | 0.3 |
| LYCASIN | — | 14.4 | — | — | — | 14.4 | 14.4 |
| SORBITOL LIQUID | 12.0 | — | 12.0 | 12.0 | 12.0 | — | — |
| SUNFIBER | — | — | 5.0 | 15.0 | 40.0 | 15.0 | 40.0 |

Figure 2:
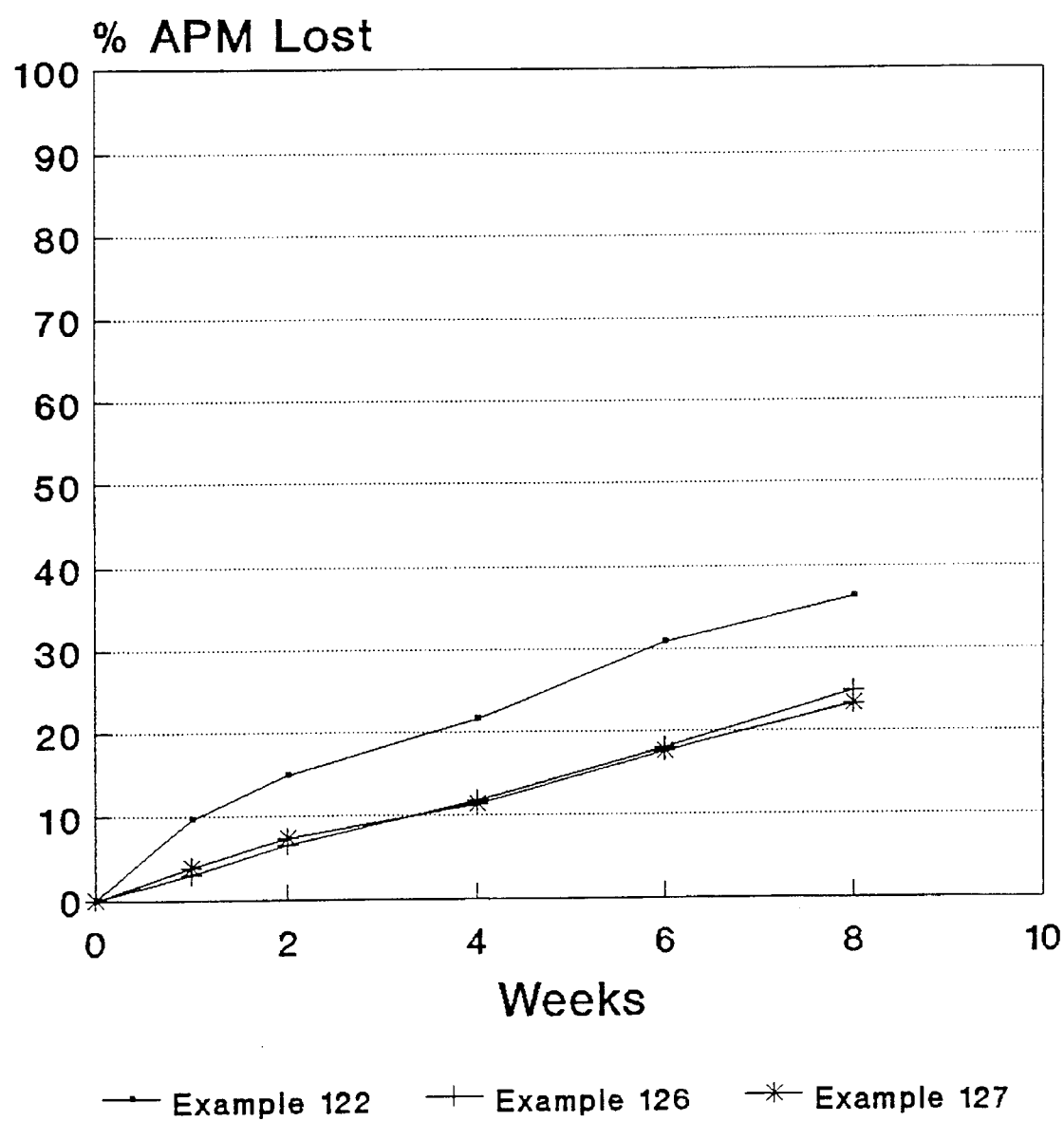
FIG. 2 shows test results of aspartame stability for gum made with Lycasin brand HSH syrup and guar gum hydrolyzate.

These formulas were made in a conventional lab mixer in a conventional manner and formed into square pellets. Samples of each formula were placed in six sealed pouches and stored at 85° F. for 0, 1, 2, 4, 6 and 8 weeks. Samples were then removed and analyzed for aspartame to determine degradation. The test results for Examples 121, 123, 124 and 125 are shown in FIG. 1 for gum made with sorbitol liquid, and the test results for Examples 122, 126 and 127 are shown in FIG. 2 for gum made with Lycasin brand HSH syrup. Results show that in both types of formulations, guar gum hydrolyzate improves aspartame stability significantly as compared to when a guar gum hydrolyzate material is not used. As seen in both FIGS. 1 and 2, after eight weeks of storage at 85° F., there was more than a 5% decrease in the amount of aspartame that decomposed in the gum formulas that includes at least 15% guar gum hydrolyzate. Also, Examples 125, 126 and 127 produced a gum composition in which the guar gum hydrolyzate was effective such that after eight weeks of storage, over 60% of the unencapsulated aspartame originally formulated in the gum composition remained undecomposed.

Examples 128–135

The following gum formulations were made:

|  | EX. 128 | EX. 129 | EX. 130 | EX. 131 | EX. 132 | EX. 133 | EX. 134 | EX. 135 |
| --- | --- | --- | --- | --- | --- | --- | --- | --- |
| BASE | 24.7 | 24.7 | 24.7 | 24.7 | 24.7 | 24.7 | 24.7 | 24.7 |
| SORBITOL | 35.0 | 50.0 | 35.0 | 50.0 | 35.0 | 50.0 | 35.0 | 50.0 |
| MANNITOL | 9.4 | 9.4 | 9.4 | 9.4 | 9.4 | 9.4 | 9.4 | 9.4 |
| GLYCERIN | 2.0 | 2.0 | 5.0 | 5.0 | 8.0 | 8.0 | 11.0 | 11.0 |
| LECITHIN | 0.2 | 0.2 | 0.2 | 0.2 | 0.2 | 0.2 | 0.2 | 0.2 |
| PEPPERMINT FLAVOR | 1.4 | 1.4 | 1.4 | 1.4 | 1.4 | 1.4 | 1.4 | 1.4 |
| ASPARTAME | 0.3 | 0.3 | 0.3 | 0.3 | 0.3 | 0.3 | 0.3 | 0.3 |
| SORBITOL LIQUID | 12.0 | 12.0 | 9.0 | 9.0 | 6.0 | 6.0 | 3.0 | 3.0 |
| SUNFIBER | 15.0 | — | 15.0 | — | 15.0 | — | 15.0 | — |

These formulas were made in a conventional lab mixer in a conventional manner and formed into square pellets. Samples of each formula were placed in six sealed pouches and stored at 85° F. for 0, 1, 2, 4, 6, and 8 weeks. Samples were then removed and analyzed for aspartame to determine degradation. The test results are shown in FIG. 3 for Examples 128–131 and FIG. 4 for Examples 132–135.

Figure 3:
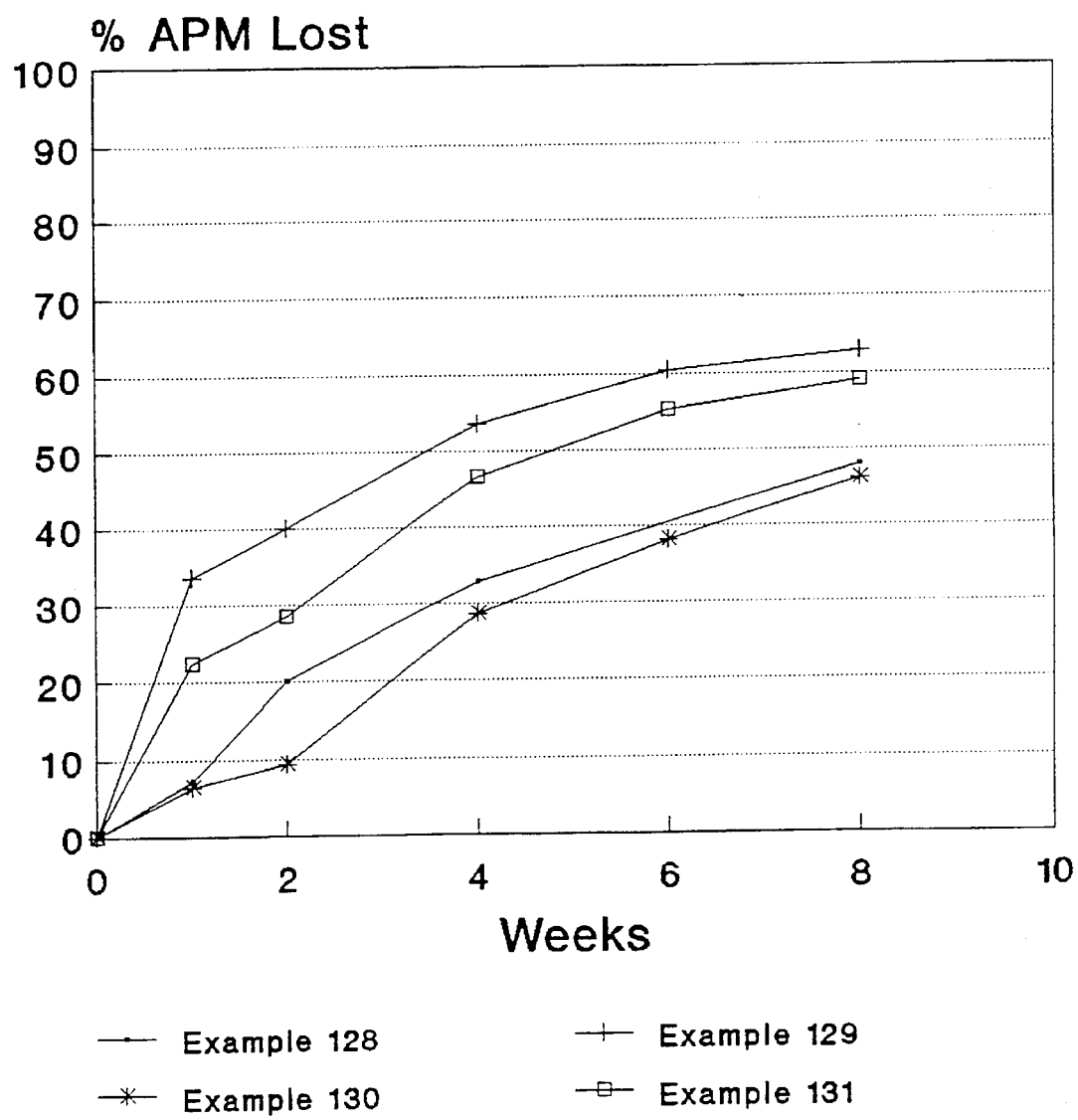
FIGS. 3 and 4 show test results of aspartame stability for gum made with liquid sorbitol, with and without guar gum hydrolyzate.
Figure 4:
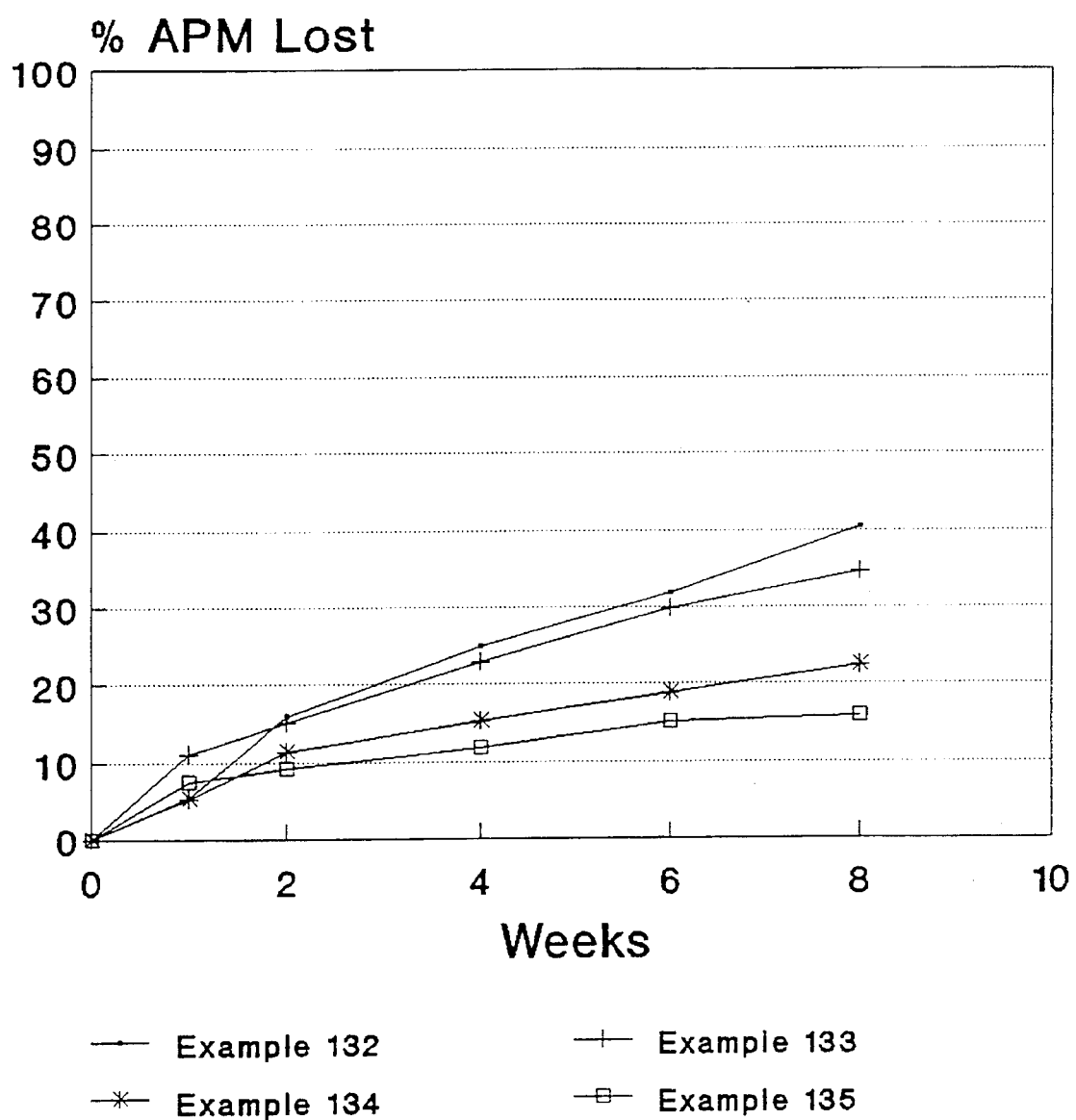

For both of the 12% and 9% levels of sorbitol liquid used, it is shown in FIG. 3 that 15% guar gum hydrolyzate improves aspartame stability. Compare Examples 128 vs. 129, 130 vs. 131. However, stability improvement decreases with lower levels of moisture in the gum formula. The other samples using 6% and 3% sorbitol liquid (FIG. 4) did not show improved aspartame stability. Approximate moisture levels, mostly from sorbitol liquid (containing 30% water), are:

Examples 128–129—4%

Examples 130–131—3%

Examples 132–133—2%

Examples 134–135—1%

However, even with as low as 3% moisture in a gum formula (Examples 130 and 131), aspartame stability is improved by about a 20% reduction in degradation due to the addition of 15% powdered guar gum hydrolyzate.

It should be appreciated that the compositions and methods of the present invention are capable of being incorporated in the form of a variety of embodiments, only a few of which have been illustrated and described above. The invention may be embodied in other forms without departing from its spirit or essential characteristics. For example, another natural carbohydrate gum hydrolyzate such as locust bean gum hydrolyzate or karaya gum hydrolyzate could be used in place of guar gum hydrolyzate in the foregoing examples. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A chewing gum composition comprising sweetness imparting amounts of unencapsulated aspartame and an effective amount of a natural carbohydrate gum hydrolyzate to stabilize said aspartame against decomposition during storage at 85° F. for eight weeks whereby at least 5% less aspartame decomposes into non-sweetening derivatives than would have decomposed if the natural carbohydrate gum hydrolyzate was not included in the gum composition.

2. The chewing gum composition of claim 1 wherein the gum composition comprises at least 15% natural carbohydrate gum hydrolyzate.

3. The chewing gum composition of claim 1 wherein the gum composition comprises about 0.005% to about 1% unencapsulated aspartame.

4. The chewing gum composition of claim 1 wherein the natural carbohydrate gum hydrolyzate is effective such that after eight weeks of storage at 85° F., over 60% of the unencapsulated aspartame originally formulated in the gum composition remains undecomposed.

5. A chewing gum composition comprising a high-intensity sweetener encapsulated with a natural carbohydrate gum hydrolyzate.

6. A chewing gum composition comprising a flavor encapsulated with a natural carbohydrate gum hydrolyzate.

7. The chewing gum composition of any of claims 1–6 wherein the natural carbohydrate gum hydrolyzate is either formed by acid hydrolysis or enzyme hydrolysis and is in the form selected from the group consisting of a natural carbohydrate hydrolyzate powder, a natural carbohydrate gum hydrolyzate syrup and mixtures thereof.

8. A chewing gum product having a rolling compound thereon, the rolling compound comprising natural carbohydrate gum hydrolyzate.

9. The chewing gum product of claim 8 wherein the natural carbohydrate gum hydrolyzate comprises from about 0.5% to 100% of the rolling compound.

10. The chewing gum product of claim 8 wherein the natural carbohydrate gum hydrolyzate comprises from about 0.005% to about 5% of the chewing gum product.

11. A chewing gum product having a liquid center wherein the liquid center comprises a natural carbohydrate gum hydrolyzate.

12. The chewing gum product of any of claims 8–11 wherein the natural carbohydrate gum hydrolyzate is either formed by acid hydrolysis or enzyme hydrolysis and is in the form selected from the group consisting of a natural carbohydrate gum hydrolyzate powder, a natural carbohydrate gum hydrolyzate syrup and mixtures thereof.

13. A method of making chewing gum comprising the steps of:

a) co-drying a solution containing a natural carbohydrate gum hydrolyzate and another sweetener selected from the group consisting of sugar sweeteners, alditol sweeteners and high-intensity sweeteners, and b) mixing the co-dried natural carbohydrate gum hydrolyzate sweetener with gum base and flavoring agents to produce a gum composition.

14. A method of making chewing gum comprising the steps of:

a) co-evaporating an aqueous solution comprising a natural carbohydrate gum hydrolyzate and a plasticizing agent to form a syrup, and b) mixing the syrup with gum base, bulking agents and flavoring agents to produce a gum composition.

15. The method of claim 14 wherein the plasticizing agent is selected from the group consisting of glycerin, propylene glycol and mixtures thereof.

16. The method of any of claims 13–15 wherein the natural carbohydrate gum hydrolyzate is either formed by acid hydrolysis or enzyme hydrolysis and is in the form selected from the group consisting of a natural carbohydrate gum hydrolyzate powder, a natural carbohydrate gum hydrolyzate syrup and mixtures thereof.

17. The chewing gum composition of claim 1 wherein the naturel carbohydrate gum hydrolyzate is in the form of an aqueous syrup.

18. A chewing gum composition comprising:
a) about 5% to about 95% gum base;
b) about 0.1% to about 10% of a flavoring agent;
c) about 5% to about 90% bulking and sweetening agent, the bulking agent comprising at least in part natural carbohydrate gum hydrolyzate; and
d) sweetening amounts of aspartame.

19. The chewing gum composition of any of claims 1–6 and 17–18 wherein the composition is non-cariogenic.

20. The chewing gum composition of any of claims 1–6 and 17–18 wherein the natural carbohydrate gum hydrolyzate is guar gum hydrolyzate.

* * * * *

UNITED STATES PATENT AND TRADEMARK OFFICE
CERTIFICATE OF CORRECTION

PATENT NO. : 5,612,070
DATED : March 18, 1997
INVENTOR(S) : Robert J. Yatka et al.

It is certified that error appears in the above-identified patent and that said Letters Patent is hereby corrected as shown below:

In column 2, line 33, insert --that-- immediately after "gum".

In column 12, line 37, insert --.-- immediately after "syrup".

In column 13, line 18, replace "guam" with --gum--.

In Claim 17, line 2, replace "naturel" with --natural--.

Signed and Sealed this

Twenty-fifth Day of May, 1999

Attest:

Attesting Officer

Q. TODD DICKINSON

Acting Commissioner of Patents and Trademarks